United States Patent [19]

Fitzner et al.

[11] Patent Number: 5,685,037
[45] Date of Patent: Nov. 11, 1997

[54] TOOL FOR TYING FISHING LINE

[76] Inventors: Marc James Fitzner, 178 Baronwood Court, Brampton, Ontario, Canada, L6V 3H8; Ronald John Mundy, 25 Brawley Road, West, Brooklin, Ontario, Canada, L0B 1C0

[21] Appl. No.: 575,646

[22] Filed: Dec. 20, 1995

[30] Foreign Application Priority Data

Oct. 11, 1995 [CA] Canada .................. 2.160.299

[51] Int. Cl.$^6$ .................................................. A01K 97/00
[52] U.S. Cl. ................... 7/106; 43/4; 289/17; 30/289
[58] Field of Search .................... 43/4; 289/17; 7/106; D22/149; 30/289, 278, 195

[56] References Cited

U.S. PATENT DOCUMENTS

| | | | |
|---|---|---|---|
| 2,622,462 | 12/1952 | Poetker | 81/43 |
| 2,926,036 | 2/1960 | Wimberley | 289/17 |
| 3,131,957 | 5/1964 | Musto | 289/17 |
| 3,419,924 | 1/1969 | Archibald | 7/14.1 |
| 3,521,918 | 7/1970 | Hammond | 289/17 |
| 4,029,346 | 6/1977 | Browning | 289/17 |
| 4,144,605 | 3/1979 | Eberhardt | 7/106 |
| 4,566,213 | 1/1986 | Cossin | 43/1 |
| 4,573,719 | 3/1986 | Aldridge | 289/17 |
| 4,660,314 | 4/1987 | Janssen et al. | 43/4 |
| 4,796,372 | 1/1989 | Klein | 43/4 |
| 4,819,673 | 4/1989 | McMullen, Jr. | 30/28 |
| 4,864,762 | 9/1989 | Cox | 43/4 |
| 5,176,222 | 1/1993 | Tippin | 7/118 |
| 5,197,217 | 3/1993 | Browning | 43/4 |
| 5,383,695 | 1/1995 | Couper | 289/17 |

FOREIGN PATENT DOCUMENTS

| | | | |
|---|---|---|---|
| 972922 | 10/1964 | United Kingdom | 289/17 |
| 993815 | 6/1965 | United Kingdom | 289/17 |
| 1582730 | 1/1981 | United Kingdom | 43/4 |

*Primary Examiner*—Jeanne Elpel
*Attorney, Agent, or Firm*—Gifford, Krass, Groh, Sprinkle, Patmore, Anderson & Citkowski, P.C.

[57] ABSTRACT

A fishing tool equipped with a number of useful features including a fish hook sneller. The tool comprises a support body with a hook holding mechanism provided at one end of this body adapted to engage a section of a hook. A line holder has first and second spaced apart arms with the first arm being longer than the second and generally parallel thereto. These arms are connected together and slidable in the support body between an outer position in which both arms project from the side of the support body and an inner position wherein the second arm does not project at all or substantially from the side of the support body and the first arm is flush or slightly protruding. The first arm is provided with a line catching member at one end thereof so that a line looped around this arm will not slip off when the arms are slid to the inner position. In a preferred embodiment, the line holder is generally U-shaped with a connecting section extending between ends of the two arms. The tool can be provided with a line cutting blade fixedly mounted in the support body as well as a hook engaging pin for pulling on a hook once a line has been tied thereto. Also, a fish disgorger can be pivotably mounted to one end of the support body.

20 Claims, 3 Drawing Sheets

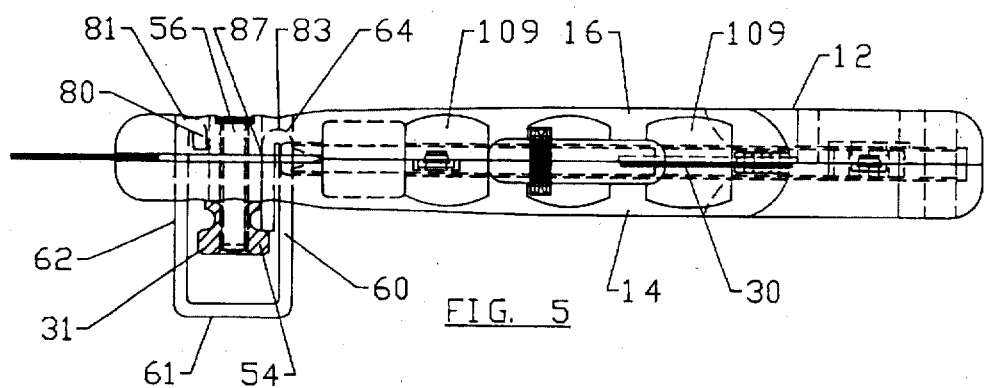
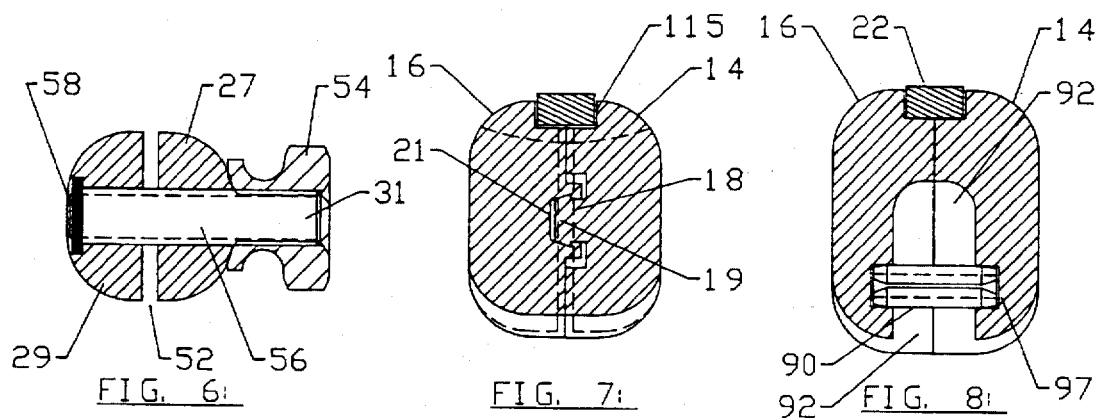
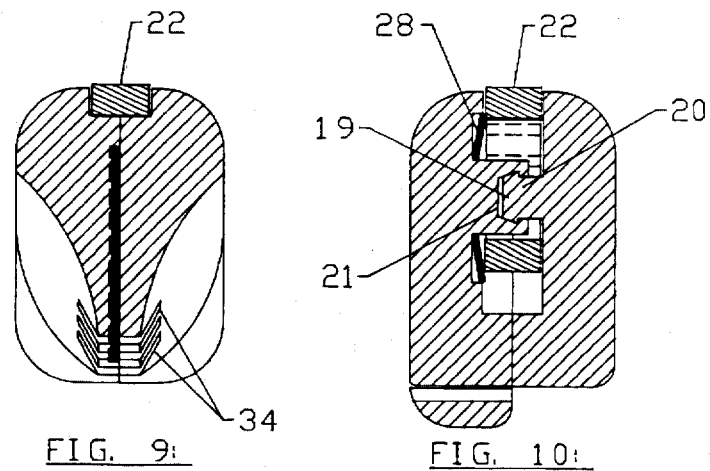

5,685,037

TOOL FOR TYING FISHING LINE

BACKGROUND OF THE INVENTION

This invention relates to tools for use by fishermen, in particular, tools designed for securing or tying a fishing line to a fish hook or fish hooks.

A variety of tools have been developed in the past for use by fishermen both professional and recreational. These tools include simple knives for cutting fishing line, tools for tying or snelling a fish line to a fish hook and tools for removing a hook from a fish's mouth. In many cases, the tool serves a single purpose and thus a fully equipped fisherman might require several different tools for accomplishing various routine tasks. In some cases, it is known to provide a single tool that can serve more than one function, such as a tool that can be both a hook sneller and a line cutter.

U.S. Pat. No. 4,660,314 issued Apr. 28, 1987 to Janssen describes a tool that is both a hook sneller and a line cutter. The tool has an elongated housing of a size approximating that of a pen or pencil. A sneller mechanism is formed at one end of the housing and the line cutter is incorporated within a clip on the housing. This tool includes a hook holder extending forwardly from the housing that holds a shank of the fish hook therein. There is also a line holder extending forwardly from the housing that holds a portion of a fishing line after the free end thereof is threaded through an eye in the hook. The tool also includes a line clamp that is adapted to hold the free end of the line for passing this end through bights upon rearwardly sliding the clamp, thereby forming a knot upon forward removal of the fish hook.

Earlier U.S. Pat. No. 3,419,924 issued Jan. 7, 1969 to E. R. Archibald also describes a line holder and line cutter combined in a single tool. It has a sleeve guide with a serrated lower tip into which a fish hook may be clamped by a plunger having a recessed catch engageable with the fish hook. The plunger has a cutter rim for cutting a fish line extending across a cutter notch in the sleeve guide.

Early U.S. Pat. No. 2,926,036 issued Feb. 23, 1960 to H. G. Wimberley describes a tool designed to tie a line to a fish hook or a fly. The tool includes an elongated handle of circular cross-section. Formed integrally with the forward end of the handle is a tapered, slightly downwardly curved mandrel having a notch in its forward end. Formed longitudinally in the sides of the mandrel are tapered grooves or channels. Secured on the upper forward portion of the handle is a resilient metallic finger which is spaced from the mandrel. Formed in the rear portion of the mandrel is a slot in which is mounted a cutting blade.

It is an object of the present invention to provide a simple, inexpensive tool that can be used by a fisherman to facilitate the tying of a fishing line onto a hook. The line tying mechanism is relatively simple to use, involving only one moving part, not including a hook holding mechanism that is provided on the body of the tool.

According to another object of the invention, there is provided an inexpensive fishing tool having more than one function, including the ability to tie a fishing line to a hook.

In a preferred embodiment of the fish hook sneller of the invention, there is incorporated therein a line cutting blade fixedly mounted in the body of the tool. Also, the tool preferably includes a hook engaging pin fixedly mounted in the body and extending across a recess formed in the body. After the hook is tied to the line, the hook can be placed around this pin and the line pulled in order to ensure a tight knot. A fish disgorger can also be included in the tool.

SUMMARY OF THE INVENTION

According to one aspect of the invention, a fish hook sneller comprises a support body, a hook holding mechanism provided on the support body and adapted to engage a section of a fish hook, and a line holder having first and second, spaced-apart arms. The first arm is longer than the second arm and generally parallel thereto. The arms are connected together and slidable in the support body between an outer position in which both of the arms project from a side of the support body and an inner position wherein the second arm does not project at all or substantially from the side of the support body. The first arm is provided with a line catching member at one end thereof so that a line looped around the first arm will not slip off of the one end when the arms are slid to the inner position. In order to secure an end of the line to the fish hook, the fish hook is held in the holding mechanism, the end of the line is threaded through or beside an eye or spade of the fish hook and passed around a projecting end of the second arm, the arms being in the outer position, and then the end of a line is brought back and wrapped a number of times around a shank portion of the hook. Next, the end of the line is passed around the first arm and back towards the shank of the hook. Then the arms are slid to the inner position and the line pulled to complete a knot, thereby securing the line end to the hook.

Preferably the line holder is generally U-shaped with a connecting section extending between ends of the first and second arms. The one end of the first arm can be bent back to form a hook-shaped end section providing the aforementioned line catching member.

According to another aspect of the invention, a fish hook tying device includes a support body sized for holding in one hand of a user and having first and second ends, a line tying mechanism mounted and arranged in one of these ends, and a hook engaging member fixedly mounted in a recess formed in the side of the support body. This member extends across the recess and is spaced from a bottom of the recess. After a fish hook is tied to a fish line, the hook can be placed around the hook engaging member in order to hold the hook as said line is pulled, thereby confirming a tight knot has been formed.

In a preferred embodiment the support body comprises two moulded half sections detachably connected together. The aforementioned recess is formed between these half sections and the support body is made of a plastics material. A preferred form of plastic is low density polyethylene or polypropylene.

According to a further aspect of the invention, a combined fish hook tying and line cutting device comprises a support body sized for holding in one hand of a user, a line tying mechanism mounted and arranged in an end section of this body, and line cutting blade fixedly mounted in the support body and spaced from the line tying mechanism. The blade has a cutting edge exposed for cutting along one side of the support body. There is also a finger protection mechanism provided on the support body to help prevent a user inadvertently cutting his or her finger on the blade. The finger protection mechanism forms two or more spaced apart protuberances along the cutting edge and relatively small slots for receiving the line to be cut.

In a preferred embodiment of this combined tool, the body comprises two moulded half sections detachably connected together with the blade sandwiched between these sections.

According to still another aspect of the invention, a fish hook sneller for tying an end of a fishing line to a hook includes a support body having a length and a width, this body having means for temporarily holding the hook to prevent relative movement between the hook and the body. A line holder is slidably mounted in the support body and is capable of holding sections of the fishing line in position for line tying purposes. The line holder has two, generally parallel, spaced-apart arms that are connected together for simultaneous, sliding movement in the widthwise direction of the support body. The line holder is slidable between an outer position in which both arms project from a side of the support body and an inner position where the second arm does not project from the side of the support body. In this inner position, the first arm does not project from or protrudes only slightly from the side of the support body.

Further features and advantages will become apparent from the following detailed description taken in conjunction with the accompanying drawings.

BRIEF DESCRIPTION OF THE DRAWINGS

FIG. 5 is a bottom view of the tool of FIG. 4;

FIG. 6 is a transverse cross-section taken along the line VI—VI of FIG. 4;

FIG. 7 is a transverse cross-section taken along the line VII—VII of FIG. 4;

FIG. 8 is a transverse cross-section taken along the line VIII—VIII of FIG. 4;

FIG. 9 is a transverse cross-section taken along the line IX—IX of FIG. 4;

FIG. 10 is a transverse cross-section taken along the line X—X of FIG. 4;

DETAILED DESCRIPTION OF PREFERRED EMBODIMENT

Figure 1:
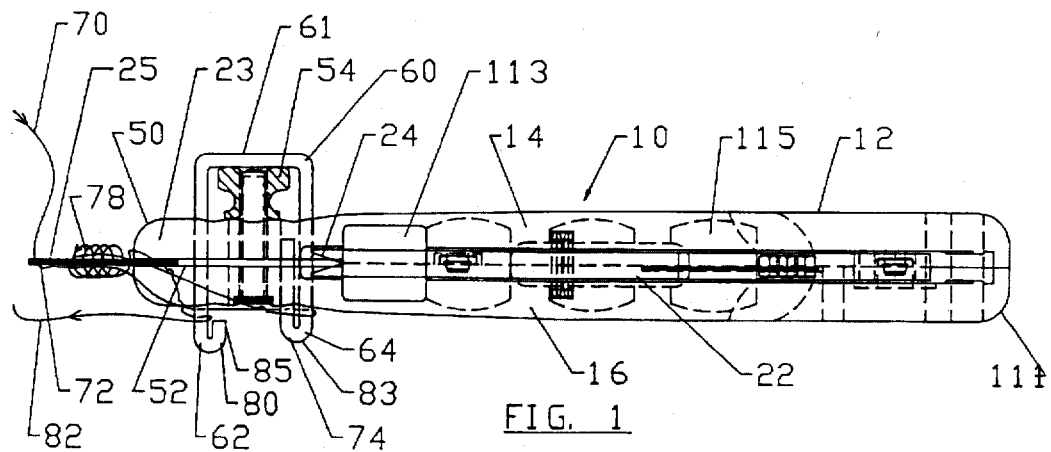
FIG. 1 is a top view of a fishing tool constructed in accordance with the invention.

A preferred form of fishing tool 10 constructed in accordance with the invention is illustrated in detail in FIGS. 1 to 5 of the drawings. A primary function of this tool is to serve as a fish hook sneller or, in other words, a device for tying a fishing line to a fish hook or fishing fly. The tool 10 includes a support body 12 which, in the illustrated preferred embodiment is elongate and sized to be held in one hand of a user. Also, the preferred support body is constructed from two half sections 14 and 16 which are detachably connected together. According to a preferred construction, these half sections are made of moulded plastic and can be constructed in such a manner that the overall tool is able to float in water. Preferred plastics for these half sections are low density polyethylene or polypropylene. These sections can be made with a hollowed core with air being inserted into the mould as they are formed. Preferably the half sections 14 and 16 are snapped together by the use of snap connectors 18 and 20 which are illustrated in cross-section in FIGS. 7 and 10. Each snap fastener per se is of standard construction and includes an enlarged protuberance 19 at the end of a short stem, which protuberance snaps snugly into a round recess 21.

The preferred tool includes a hook holding mechanism 23 provided on the support body 12 and adapted to engage a section of a fish hook 25. The holding mechanism 23 is provided by flexible, adjacent end sections 27 and 29 of the support body. A hook receiving slot 52 is formed between these end sections which are at a narrow front end 50 of the support body. The size of the slot and therefore the clamping force on the fish hook is adjustable by means of a threaded clamping device 31 which is able to draw together the adjacent ends of the half sections 14 and 16. The clamping device 31 preferably includes a serrated knob 54 which can be turned with a user's finger and thumb. The knob, which can also be made of plastic, is mounted on the end of a non-rotatable stud or bolt 56 which is pressed into a hole 58 opposite the knob 54. The knob 54 is threaded onto this stud and is rotatable with respect to same in order to widen or narrow the slot 52.

The tool 10 includes a line holder 60 which is used to attach or tie a fishing line to a fishing hook or fishing fly. In the illustrated preferred embodiment, the line holder is generally U-shaped with a connecting section 61 extending between ends of first and second, generally parallel arms 62 and 64. The first arm 62 is longer than the second arm 64 as shown in FIGS. 1 and 5. The spaced apart arms are slidable in the support body 12 between an outer position (shown in solid lines in FIGS. 1 and 5) in which both arms project from the side of the support body and an inner position (indicated in dash lines in FIG. 5) where the second arm 64 does not project at all or does not project a substantial distance from the adjacent side of the support body and the first arm 62 is flush with or only slightly protruding from the adjacent side. As explained hereinafter, this movement of the line holder 60 is used to manipulate the fishing line as a knot is being tied to secure the line to the fish hook.

It will be noted that the first arm 62 is provided with a line catching member 80 at one end thereof so that a fishing line looped around the first arm will not slip off of this end of the arm when the arms are slid to the inner position. In order to form the member 80, the free end of the first arm 62 is bent back to form a hook-shaped end section. In the preferred illustrated embodiment, both the first and second arms 62 and 64 are J-shaped with free ends 81 and 83 that are rounded. Thus, each of the arms has an inwardly extending section. The inwardly extending section 85 of first arm 62 is substantially shorter than the inwardly extending section 87 of the second arm 64. The first arm 62 extends through holes 89 formed in the support body. The shorter second arm 64 extends through holes 91 formed in the support body. Although the line holder can be held loosely in the tool, in order to prevent the line holder 60 from sliding freely in these holes, the holder 60 can be made from a metallic, spring material and the J-shaped arm 64 can have a total transverse dimension which causes both sections of this arm to press slightly against the sides of the holes 91 so that there is slight friction. In other words, the inwardly extending section 87 of this arm preferably continuously presses against the side of the hole, thus offering some resistance to a free sliding movement of the line holder 60. This is helpful in the formation of the knot which is explained below. It will be further noted that the support body 12 is elongate, having a length and a width. The line holder 60 is able to slide in the width wide direction of the support body 12.

Figure 3:
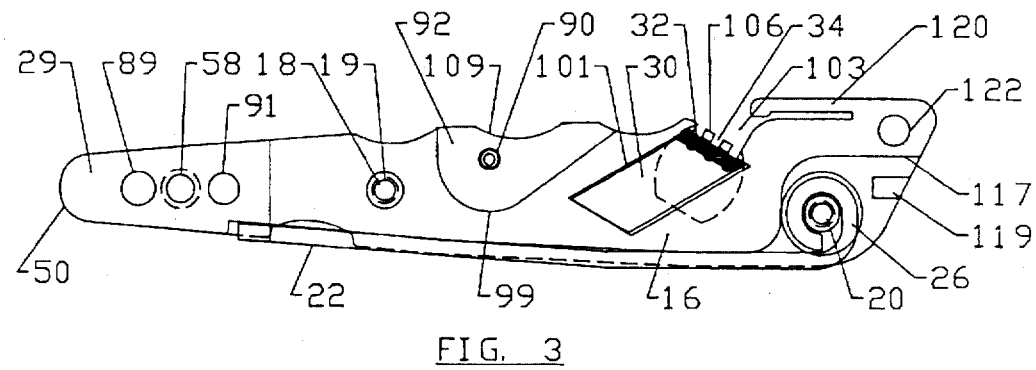
FIG. 3 is a longitudinal view showing the inside surface of the other moulded half along with some inner parts of the tool.

In addition to the line tying mechanism described above, the illustrated preferred tool 10 includes a line cutting blade 30 which can be made of a steel similar to that used for razor blades or the blades of utility knives. The blade 30 is fixedly mounted in the support body 12 as shown. In the illustrated version, the blade edge is exposed along the bottom side of the tool. The blade 30 is spaced from the line tying mechanism which includes the line holder 60. The cutting edge 32 of the blade is exposed for cutting along this one side. The blade 30 is sandwiched between the half sections 14 and 16. As shown in FIG. 3, a shallow recess 101 can be formed in the half section 16 to accommodate the blade and to hold it in the correct position when the two half sections 14 and 16 are being joined together. Also, the cutting edge 32 is preferably arranged in a recess 103 formed in the bottom side of the support body 12. The provision of the recess 103 helps to channel the fishing line to be cut towards the blade as it is drawn across the width of the tool.

Preferably finger protection means indicated generally at 105 and 106 are provided on the support body to help prevent a user inadvertently cutting his or her finger on the blade 30. The illustrated finger protection means form two or more spaced apart protuberances along the cutting edge 32 and relatively small slots 34 for receiving the line to be cut. The slots 34 should be preferably wide enough to accommodate larger sizes of fishing line. Obviously the blade 30 can be used to cut off excess line after the fish hook has been secured to the fishing line.

Another preferred feature of the tool 10 is a hook engaging pin 90 that is fixedly mounted in the support body 12 and extends across a central recess 92. The recess 92 is open on the bottom side of the tool in the illustrated embodiment. The pin 90 is spaced from a bottom 99 of the recess. This arrangement permits a fish hook, after it has been tied to a fishing line, to be placed around the hook engaging member or pin 90 so that the hook can be held thereby as the line is pulled, thereby forming or ensuring a tight knot.

Figure 2:
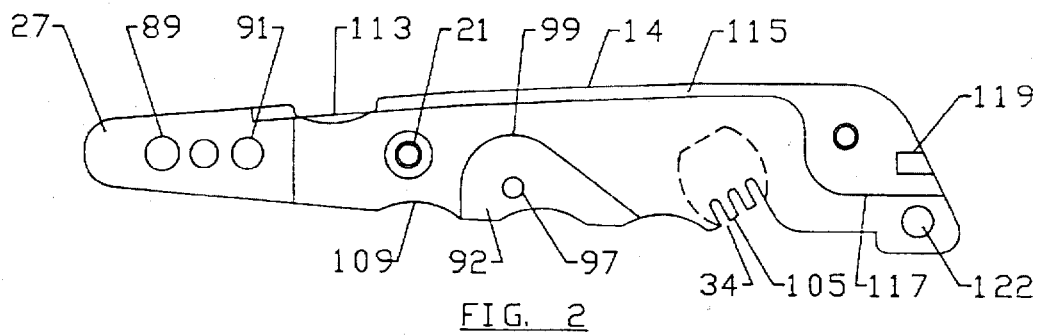
FIG. 2 is a longitudinal view showing the inside surface of one moulded half of the tool.

As clearly shown in FIGS. 2 and 3, the recess 92 is formed between the two half sections 14 and 16 and, in the preferred embodiment, it is moulded into these plastic sections. A hole 97 is formed in the half section 14 to hold one end of the pin 90. In the elongate support body 12, the recess 92 is formed about midway along the length of the support body. In order to assist a user in firmly holding the support body, such as during the hook securing operation, the body 12 can be formed with finger grip recesses 109 moulded along one side thereof.

Another preferred feature of the tool 10 is the inclusion of a fish disgorger 22 pivotably mounted in the support body 12 at a wider end 111 thereof. Thus the fish disgorger is mounted at the end opposite the narrower end of the support body where the hook holding mechanism 23 and the line holder 60 are located. The illustrated fish disgorger comprises an elongate wire-like member with a loop 26 formed at one end. It can be made of cast aluminum in order to reduce weight. The snap connector 20 extends through the loop 26 and thus acts as a pivot pin for the disgorger. Preferably an elongate groove 115 is formed in the top of the support body to accommodate the disgorger when it is not in use. The disgorger 22 ends in a V-slot 24 which is the end used to remove a hook from a fish's mouth or throat, when required. Preferably a further recess 113 is formed in the top of the support body 12 to enable a user's thumb and finger to pull out the disgorger. Preferably means are provided for preventing the disgorger from inadvertently or accidently pivoting out of its groove 115. This movement restrainer can comprise a spring washer 28 (see FIG. 10) located at one end of the snap connector 20 and pressing against one side of the disgorger. The spring washer also helps to maintain the disgorger at its point of rotation. Shoulders 117 formed at the wide end of the half sections 14 and 16 prevent the disgorger from rotating too far. Preferably, small protuberances 119 are also formed on the half sections 14 and 16 and are spaced the thickness of the disgorger away from the shoulders 117. These protuberances help to lock the disgorger into position after it has been fully rotated to the open position and rests against the shoulders 117.

Figure 4:
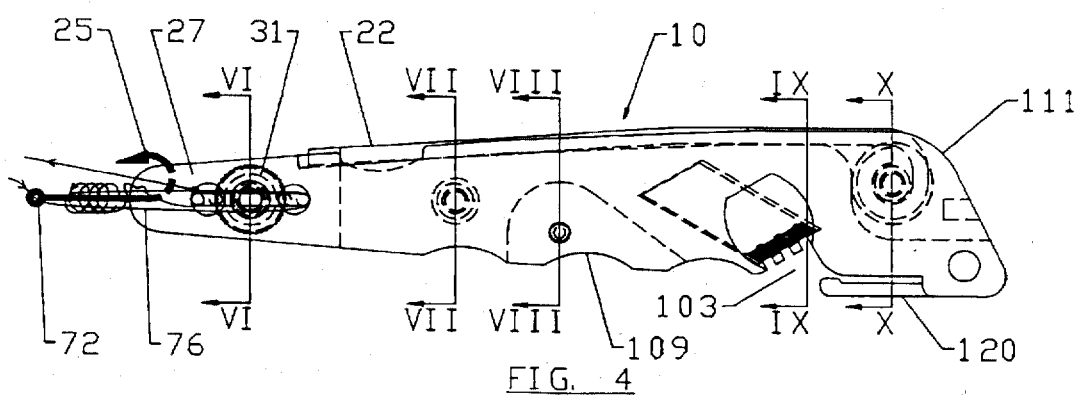
FIG. 4 is a side elevation of the tool constructed in accordance with the invention, which view also shows a fishing hook clamped in one end.
Figure 11:
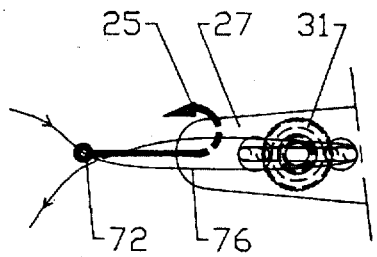
FIG. 11 is a detail side view showing the initial step of tying a line to a hook.
Figure 12:
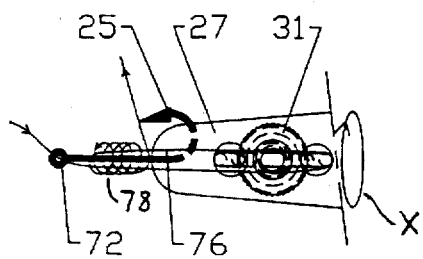
FIG. 12 is a detail side view showing the next step of forming a series of loop around the shank of the hook.

The procedure for tying a fishing line to a fish hook using the preferred tool 10 will now be explained with particular reference to FIGS. 11 to 15. In order to tie the fishing line 70 to the fish hook 25, the two half sections 14 and 16 are separated at the narrow end 50, forming or widening the slot 52 and, as shown in FIGS. 4 and 11, the semi-circular end of the hook 25 is received in this slot. By rotating the knob 54, the narrow ends of the half sections 14 and 16 can be drawn together to clamp the hook in the position as shown with minimum force.

Figure 13:
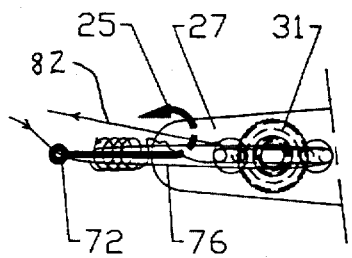
FIG. 13 is a detail side view showing the third step of passing the line around the long arm of the line holding member.

With the hook in the proper position for tying and clamped in the tool, the fishing line can be fed through the hole 72 formed in the end of the hook (see FIG. 11). The manner in which the line is manipulated by the fishermen and the tool 10 is illustrated in FIGS. 1, 4 and 11 to 13 of the drawings. After passing through or beside the hole 72, the end of the fishing line is pulled and drawn around the projecting end 74 of the line holder 60 which is in its outer position. The drawn back line at 76 is then looped a number of times, for example, four to six, around a shank portion of the hook as indicated at 78 (see FIGS. 1 and 12), with the line from the rod taught and in-line with the rod end. This operation can be accomplished by "twirling" the tool in the user's hand, if desired (as indicated by the arrow X in FIG. 12). After this twirling operation, the end of the fishing line is looped around the longer first arm 62 as shown in FIG. 13, the line being held thereon by line catcher 80. The line is then brought back up to the position indicated at 82 in FIGS. 1 and 13. Then by pushing in on the J-shaped end of the arm 62, the line holder is moved to its inner position. This causes the rounded free end of the second arm 64 and the end of the first arm 62 to disappear into the support body 12, thereby releasing the line portion that was wrapped around the second arm. Then, by pulling on the tool in the longitudinal direction, that is towards the wider end 111, a knot is created and the fish hook can be pulled out of the tool 10. In order to ensure that the knot is tight, one can place the fish hook around the hook pin 90 so as to hold the hook as the fishing line attached thereto is pulled.

The present hook sneller can also be used to tie hooks which have no eye 72 but instead have a spade at the end of the shank portion. This is common in the construction of small hooks. With such hooks, or even with hooks that have an eye, the user of the tool can simply pass the end of the line beside the spade, then pass it around the projecting end of the second arm, and then proceed as before to complete the tying of the knot.

Figure 14:
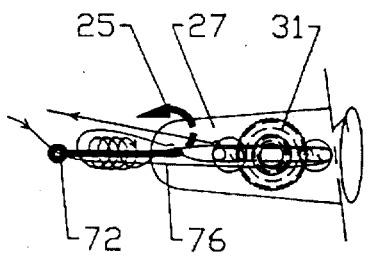
FIG. 14 is a detail view showing the manner in which the knot is tied when more than one hook is being tied to the fishing line.

FIG. 14 illustrates the slightly different procedure that is followed when more than one hook is being tied to the fishing line, for example, the third knot when stringing three hooks to a line. The tying procedure is basically the same except the loops around the shank begin near the bottom of the shank and continue up the shank towards the eye 72. After the loops are formed, the line is brought back and passed around the first arm 62.

Figure 15:
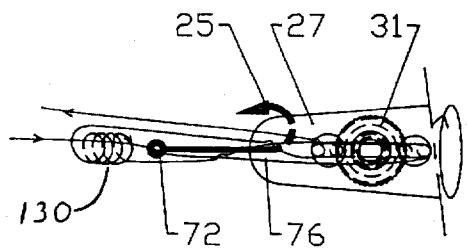
FIG. 15 is a detail view showing how a knot can be tied in a fishing line above the hook.

FIG. 15 illustrates how the present tool can be used to form a knot above the eye of the shank. The tying procedure is similar to that set out above except the loops 130 are not formed around the shank but around the line 70 just above the eye 72. The loops preferably commence a short distance away from the eye 72 and continue down the line towards the eye 72 before being passed around the first arm 62.

The preferred version of the tool 10 has a support body 12 which is sized to be held in one hand of a user. One preferred embodiment has a length of 5¼ inches and a width across the top of ⅝ths inch. This size of tool is lightweight and comfortable to use. The tool can be provided with a pocket clip 120 at its wider end, if desired. Preferably it is manufactured from corrosion resistant materials to ensure a long life in wet conditions.

The preferred, illustrated line tying mechanism of the tool can quickly, properly and securely tie a fishing line onto a hook. It can do so for a large range of lines and hooks, from 15 lb. to ½ lb. line and hooks ranging from larger sizes to miniature #22 hooks. The line tying mechanism permits anyone to tie a line strongly onto a hook in a short period of time and to do so under adverse conditions such as coldness, precipitation, darkness, or operator hindrances such as poor eyesight.

An optional preferred feature of the tool is a chain hole 122 provided at the wider end 111. Thus, the tool can be secured in a safe manner so that it does not become lost.

Preferably, the hook engaging pin 90 is a stainless steel spring pin. Similarly, the disgorger can be made from stainless steel as can the line holder 60.

It will be apparent to one skilled in this art that various modifications and changes could be made to the described fishing tool without departing from the spirit and scope of this invention. Accordingly, all such modifications and changes as fall within the scope of the accompanying claims are intended to be part of this invention.

We therefore claim:

1. A fish hook sneller comprising:

a support body;

a hook holding mechanism provided on said support body and adapted to engage a section of a fish hook;

a line holder having first and second spaced apart arms with said first arm being longer than said second arm and generally parallel thereto, said arms being connected together and slidable in said support body between an outer position in which both of said arms project from a side of said support body and an inner position where said second arm does not project substantially from said side of said support body, said first arm being provided with a line catching member at one end thereof so that a line looped around said first arm will not slip off of said one end when said arms are slid to said inner position;

wherein in use of the sneller and in order to secure an end of said line to said fish hook, said hook is held in said holding mechanism, said end of said line is threaded through or beside an eye or spade of said fish hook and passed around a projecting end of second arm, said arms being in said outer position, then said end of the line is brought back and wrapped a number of times around a shank portion of said hook, next said end of the line is passed around said first arm and back towards said shank of the hook, and then the arms are slid to said inner position and the line pulled to complete a knot, thereby securing the line end to said hook.

2. A fish hook sneller according to claim 1 wherein said line holder is generally U-shaped with a connecting section extending between ends of said first and second arms.

3. A fish hook sneller according to claim 2 wherein said one end of said first arm is bent back to form a hook-shaped end section providing said line catching member.

4. A fish hook sneller according to claim 1 wherein said hook holding mechanism is provided by movable, adjacent end sections of said support body, a hook receiving slot being formed between said end sections, and a threaded clamping device for drawing said end sections closer together in order to clamp said section of the hook between said end sections.

5. A fish hook sneller according to claim 1 wherein said support body is constructed from two half sections detachably connected together and forming a hook receiving slot between them at one end of said support body, said hook holding mechanism including said slot and means for drawing said half sections closer together at said one end in order to clamp said fish hook in said slot.

6. A fish hook sneller according to claim 2 wherein both of said first and second arms are J-shaped with free ends that are rounded, each of said arms having an inwardly extending section, the inwardly extending section of the first arm being substantially shorter than the inwardly extending section of the second arm and providing said line catching member.

7. A fish hook sneller according to claim 2 including a hook engaging pin fixedly mounted in said support body and extending across a recess formed in said support body, wherein after said hook is tied to said line, said hook can be placed around said hook pin and said line pulled in order to confirm a tight knot has been made by the sneller.

8. A fish hook tying device comprising:

a support body sized for holding in one hand of a user and having first and second ends;

a line tying mechanism mounted and arranged in one of said first and second ends, said line tying mechanism having first and second spaced apart arms, the arms being connected together and slidable in said support body for forming a knot in a fishing line;

a hook engaging member fixedly mounted in a recess formed in a side of said support body, said hook engaging member extending across said recess and being spaced from a bottom of said recess, wherein after a fish hook is tied to a fishing line, said hook can be placed around said hook engaging member in order to hold said hook as said line is pulled, thereby confirming a tight knot has been formed.

9. A fish hook tying device according to claim 8 wherein said support body comprises two moulded half sections detachably connected together, said recess being formed between said two half sections, said support body being made of a plastics material.

10. A fish hook tying device comprising:

a support body sized for holding in one hand of a user and having first and second ends;

a line tying mechanism mounted and arranged in one of said first and second ends, said line tying mechanism including means for clamping a fish hook at said one end in order to prevent movement of said hook relative to said support body when a fishing line is being tied to said hook;

a hook engaging member fixedly mounted in a recess formed in a side of said support body, said hook engaging member extending across said recess and being spaced from a bottom of said recess, wherein after said fish hook is tied to the fishing line, said hook can be placed around said hook engaging member in order to hold said hook as said line is pulled, thereby confirming a tight knot has been formed.

11. A combined fish hook tying and line cutting device comprising:

an elongate support body sized for holding in one hand of a user, the support body having a first end, a second end, and longitudinally extending sides;

a line tying mechanism mounted and arranged in an end section of said support body;

a line cutting blade fixedly mounted in a recess formed in said longitudinally extending sides, the recess being located between the first end and the second end of said support body and spaced from said line tying mechanism, said blade having a cutting edge exposed for cutting along one longitudinal side of said support body; and finger protection means provided on said support body to help prevent a user inadvertently cutting his or her finger on said blade, said finger protection means forming two or more spaced apart protuberances along said cutting edge and relatively small slots for receiving the line to be cut.

12. A combined fish hook tying and line cutting device according to claim 11 wherein said support body comprises two moulded half sections detachably connected together, said blade being sandwiched between said half sections.

13. A combined fish hook tying and line cutting device according to claim 11 wherein said recess and said blade are located adjacent an end of said support body opposite said end section.

14. A combined fish hook tying and line cutting device according to claim 11 wherein said line tying mechanism includes means for clamping a fish hook in said end section in order to prevent movement of said hook relative to said support body when a fishing line is being tied to said hook.

15. A combined fish hook tying and line cutting device according to claim 11 wherein said line tying mechanism includes a line holder having first and second spaced-apart arms, said first arm being longer than said second arm and generally parallel thereto, said arms being connected together and slidable in said support body from an inner position to an outer position where both arms project from a side of said support body.

16. A fish hook sneller for tying an end of a fishing line to a hook, said sneller comprising:

a support body having a length and a width, said body having means for temporarily holding said hook to prevent relative movement between said hook and said body; and a line holder slidably mounted in said support body and capable of holding sections of said fishing line in position for line tying purposes, said line holder having two, generally parallel, spaced-apart arms that are connected together for simultaneous, sliding movement in the widthwise direction of the support body, said line holder being slidable between an outer position in which both arms project from a side of said support body and an inner position where said second arm does not project from said side of said support body.

17. A fish hook sneller according to claim 16 wherein said first arm has a line catching member at one end thereof so that a line looped around said first arm will not slip off said one end thereof when said arms are slid to said inner position.

18. A fish hook sneller according to claim 17 wherein said first arm is longer than said second arm and does not project from or protrudes only slightly from said side of the support body at the inner position.

19. A fish hook sneller according to claim 16 wherein said hook holding means is provided by movable, adjacent end sections of said support body, a hook receiving slot being formed between said end sections, and a threaded clamping device for drawing said end sections closer together in order to clamp part of said hook between said end sections.

20. A fish hook sneller according to claim 16 including a fish disgorger pivotally mounted to said support body, said support body being elongate and having a first end and a second end, wherein said hook holding means and said line holder are located adjacent said first end and said fish disgorger is mounted adjacent said second end.

* * * * *